United States Patent
Kincaid et al.

(10) Patent No.: US 12,279,203 B2
(45) Date of Patent: *Apr. 15, 2025

(54) WIRELESS DEVICE POWER OPTIMIZATION UTILIZING ARTIFICIAL INTELLIGENCE AND/OR MACHINE LEARNING

(71) Applicant: Schlage Lock Company LLC, Carmel, IN (US)

(72) Inventors: Ryan C. Kincaid, Indianapolis, IN (US); Srikanth Venkateswaran, Carmel, IN (US); Robert Prostko, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,016

(22) Filed: Sep. 26, 2023

(65) Prior Publication Data

US 2024/0251343 A1    Jul. 25, 2024

Related U.S. Application Data

(63) Continuation of application No. 17/868,332, filed on Jul. 19, 2022, now Pat. No. 11,770,764, which is a
(Continued)

(51) Int. Cl.
*H04W 52/02* (2009.01)
*G06N 20/00* (2019.01)
(Continued)

(52) U.S. Cl.
CPC ........ *H04W 52/0203* (2013.01); *G06N 20/00* (2019.01); *H04W 52/38* (2013.01); *H04W 84/12* (2013.01); *H04W 88/08* (2013.01)

(58) Field of Classification Search
CPC . H04W 52/0203; H04W 52/38; H04W 84/12; H04W 88/08; G06N 20/00
See application file for complete search history.

(56) References Cited

U.S. PATENT DOCUMENTS 6,002,918 A   12/1999 Heiman et al.
6,332,077 B1  12/2001 Wu et al.
(Continued)

OTHER PUBLICATIONS

Ericsson et al., "Machine Learning for Adaptive DRX" (Year: 2012).*
(Continued)

*Primary Examiner* — Ayaz R Sheikh
*Assistant Examiner* — Tarell A Hampton
(74) *Attorney, Agent, or Firm* — Taft Stettinius & Hollister LLP

(57) ABSTRACT

A method including transmitting, by a handler device associated with package handler, a message to an access control system requesting access to a secure container secured by an electronic lock mechanism; determining, by the access control system, whether the package handler is authorized to access the secure container based on the received message; transmitting, by the access control system, an unlock command to the secure container in response to a determination that the package handler is authorized to access the secure container; and unlocking the electronic lock mechanism of the secure container in response to successful authentication of the unlock command.

19 Claims, 5 Drawing Sheets

Related U.S. Application Data continuation of application No. 16/682,654, filed on Nov. 13, 2019, now Pat. No. 11,395,221.

(51) Int. Cl.
*H04W 52/38* (2009.01)
*H04W 84/12* (2009.01)
*H04W 88/08* (2009.01)

(56) References Cited

U.S. PATENT DOCUMENTS

| | | | |
|---|---|---|---|
| 9,179,495 | B1 | 11/2015 | Scherzer et al. |
| 10,366,556 | B1* | 7/2019 | Mondrow .......... G07C 9/00309 |
| 2004/0165574 | A1 | 8/2004 | Kakamaru et al. |
| 2004/0258102 | A1 | 12/2004 | Callaway et al. |
| 2005/0083943 | A1* | 4/2005 | Lee .................... H04W 72/21 |
| | | | 370/342 |
| 2008/0232373 | A1 | 9/2008 | Iyer et al. |
| 2009/0161599 | A1* | 6/2009 | Haartsen .......... H04W 74/0891 |
| | | | 455/434 |
| 2012/0320755 | A1 | 12/2012 | Seok et al. |
| 2013/0109403 | A1 | 5/2013 | Kim et al. |
| 2013/0343253 | A1 | 12/2013 | Ma |
| 2014/0064166 | A1 | 3/2014 | HomChaudhuri et al. |
| 2014/0120962 | A1 | 5/2014 | Merlin et al. |
| 2014/0169191 | A1 | 6/2014 | Jiang et al. |
| 2014/0204822 | A1 | 7/2014 | Park et al. |
| 2014/0281623 | A1 | 9/2014 | Zhang et al. |
| 2014/0328257 | A1 | 11/2014 | Kamlani |
| 2014/0341128 | A1 | 11/2014 | Turtinen et al. |
| 2015/0146548 | A1 | 5/2015 | Wang |
| 2015/0334654 | A1 | 11/2015 | Choi et al. |
| 2016/0242117 | A1 | 8/2016 | Lin et al. |
| 2016/0255578 | A1 | 9/2016 | Lin et al. |
| 2017/0019865 | A1 | 1/2017 | Wang et al. |
| 2017/0103420 | A1* | 4/2017 | Ramasarma ............ G01S 19/39 |
| 2017/0295556 | A1* | 10/2017 | Krishnamoorthy ..... H04W 4/12 |
| 2017/0359300 | A1 | 12/2017 | Patil et al. |
| 2018/0092039 | A1 | 3/2018 | Cariou et al. |
| 2018/0124704 | A1 | 5/2018 | Jung et al. |
| 2018/0255589 | A1 | 9/2018 | Patil et al. |
| 2018/0288703 | A1 | 10/2018 | Sun et al. |
| 2019/0227528 | A1* | 7/2019 | Abbott .................. G06N 20/00 |
| 2019/0342835 | A1 | 11/2019 | Gong et al. |
| 2019/0349851 | A1 | 11/2019 | Kim et al. |
| 2019/0371342 | A1 | 12/2019 | Tukka et al. |

OTHER PUBLICATIONS

Extended European Search Report; European Patent Office; European Patent Application No. 20886539.4; Nov. 14, 2023; 9 pages.
T. H. Lim and S. H. Rhee, "An Adaptive Power Management Scheme for WLANs Using Reinforcement Learning," 2019 International Conference on Information and Communication Technology Convergence (ICTC), 2019, pp. 412-415, (Year: 2019).
8 Reasons to Turn Down the Transmit Power of Your Wi-Fi, Metis, Nov. 13, 2019, 23 pages, https://metis.fi/en/2017/10/txpower/.
Tian et al., "Extension of the IEEE 802.11ah ns-3 Simulation Module", Association for 1-20 Computing Machinery, Jun. 2018, retrieved on [Dec. 1, 2021]. Retrieved from the internet <URL: https://biblio.ugent.be/publication/8565894/file/8565896.pf>.
International Search Report; International Searching Authority; International Patent Application No. PCT/US2020/060484; Mar. 9, 2021; 2 pages.
Written Opinion of the International Searching Authority; International Searching Authority; International Patent Application No. PCT/US2020/060484; Mar. 9, 2021; 7 pages.
Canadian Examination Report; Canadian Intellectual Property Office; Canadian Patent Application No. 3,158,478; Jul. 13, 2023; 3 pages.
Australian Examination Report; Australian Intellectual Property Office; Australian Patent Application No. 2020381509; Jan. 10, 2023; 4 pages.
Australian Examination Report; Australian Intellectual Property Office; Australian Patent Application No. 2020381509; Feb. 3, 2023; 3 pages.

* cited by examiner

WIRELESS DEVICE POWER OPTIMIZATION UTILIZING ARTIFICIAL INTELLIGENCE AND/OR MACHINE LEARNING

CROSS REFERENCE TO RELATED APPLICATIONS

This application is a continuation of U.S. patent application Ser. No. 17/868,332 filed Jul. 19, 2022 and issued as U.S. Pat. No. 11,770,764, which is a continuation of U.S. patent application Ser. No. 16/682,654 filed Nov. 13, 2019 and issued as U.S. Pat. No. 11,395,221, the contents of which are incorporated herein by reference in their entirety.

BACKGROUND

Network settings in edge devices are typically set as static parameters that are optimized as a tradeoff between ensuring capability with a wide range of wireless access points while still maintaining an acceptable battery life. The IEEE 802.11 standard outlines specific protocols for implementing Wi-Fi-based wireless local area network (WLAN) communications, which is a prevalent wireless communication technology. The standard offers a significant amount of latitude to wireless access point vendors with respect to various aspects of the operation of wireless access points. As such, each vendor uses its discretion in handling those characteristics and parameters of its wireless access point.

SUMMARY

One embodiment is directed to a unique system, components, and methods for reducing the power consumption of devices utilizing wireless technologies. Other embodiments are directed to apparatuses, systems, devices, hardware, methods, and combinations thereof for reducing the power consumption of devices utilizing wireless technologies. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
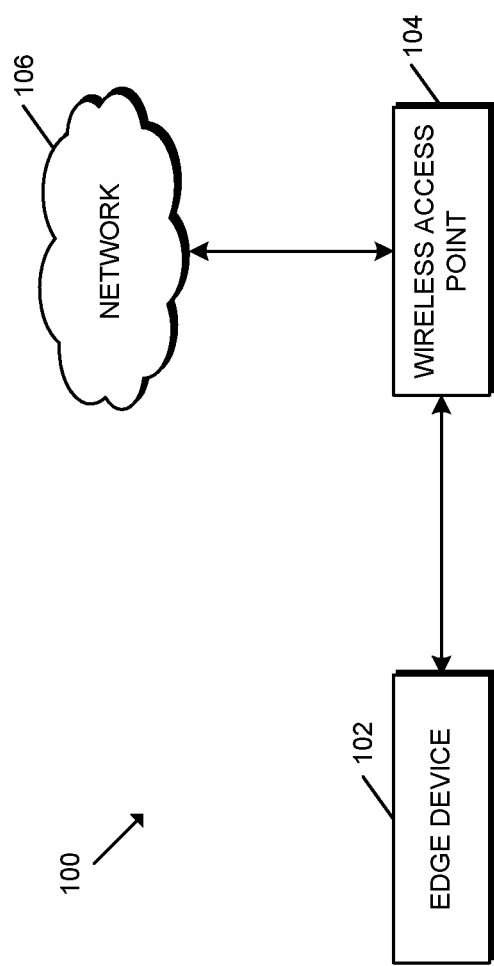
FIG. 1 is a simplified block diagram of a system for reducing the power consumption of devices utilizing wireless technologies.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 includes an edge device 102, a wireless access point 104, and a network 106. Although only one edge device 102 and one wireless access point 104 are shown in the illustrative embodiment of FIG. 1, the system 100 may include multiple edge devices 102 and/or wireless access points 104 in other embodiments. For example, in some embodiments, multiple edge devices 102 may be configured to communicate with the same wireless access point 104.

As described in detail below, in the illustrative embodiment, the edge device 102 is configured to dynamically control one or more settings of its wireless communication circuitry (e.g., Wi-Fi circuitry) in order to reduce power consumption and thereby increase the lifetime of its power supply (e.g., battery). For example, in some embodiments, the edge device 102 may configure one or more network settings, wireless communication circuitry settings, and/or other settings specific to the wireless access point 104 (e.g., based on one or more learned settings and/or environmental characteristics of the network). More specifically, the edge device 102 may adjust a wake-up interval of Wi-Fi circuitry of the edge device 102 based on a delivery traffic indication map (DTIM) interval of the wireless access point 104 determined by the edge device 102 via one or more communications between the edge device 102 and the wireless access point 104. Further, in some embodiments, the edge device 102 may determine the limit to the number of beacons transmitted from the wireless access point 104 that can be ignored by the edge device 102 without the wireless access point 104 dropping the connection with the edge device 102. In some embodiments, the edge device 102 may also reduce the transmit power of the wireless communication circuitry (e.g., Wi-Fi circuitry) relative to the maximum/full transmit power of the wireless communication circuitry in order to reduce power consumption of the edge device 102. For example, the edge device 102 may reduce the transmit power of the wireless communication circuitry to a point at which the signal is still sufficiently strong for reliable communication with the wireless access point 104. In some embodiments, the edge device 102 may analyze the Broadcasting/Multicasting Traffic and effects on Address Resolution Protocol (ARP) responses to determine the extent to which such traffic (or a portion thereof) can be ignored. For example, in many cases, the Broadcasting/Multicasting Traffic may be ignored, but that traffic includes ARP packets, which if ignored, could cause the edge device 102 to become "kicked off" or disconnected from the network and required to re-connect. As such, the edge deice 102 may determine the extent or limit to the number/amount of Broadcasting/Multicasting Traffic messages, ARP packets, and/or other relevant data transmissions that can be ignored without the wireless access point 104 dropping the connection with the edge device 102. As described below, it should be appreciated that the edge device 102 may leverage machine learning in order to determine the appropriate settings of its wireless communication circuitry for a reduction in power consumption as described herein.

The edge device 102 may be embodied as any type of device or collection of devices suitable for wireless communicating with the wireless access point 104 (e.g., via Wi-Fi circuitry) and otherwise performing the functions described herein. For example, in some embodiments, the edge device 102 may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), a peripheral controller of a passageway, credential reader device, and/or other type of access control device. As such, in some embodiments, the edge device 102 may include, or be electrically coupled to, a physical lock mechanism configured to control access through a passageway and/or other components typical of a lock device. For example, the lock mechanism may include a deadbolt, a latch bolt, a lever, and/or other mechanism adapted to move between a locked state and an unlocked state. In some embodiments, the edge device 102 may be stationary or have fixed movements (e.g., as with a fixed path of a door-mounted device). Although the edge device 102 may be described herein in reference to access control, it should be appreciated that the edge device 102 may be unrelated to access control in other embodiments.

In some embodiments, the edge device 102 may include one or more sensors configured to generate sensor data (e.g., by virtue of one or more signals), which may be interpreted by a processor of the edge device 102 to determine one or more characteristics associated with the edge device 102. For example, in various embodiments, the sensors may detect various characteristics of the physical environment of the edge device 102 (e.g., internal and/or external to the edge device 102), electrical characteristics of the edge device 102, electromagnetic characteristics of the edge device 102 and/or its surroundings, and/or other suitable characteristics. In particular, the edge device 102 may include a door position sensor configured to generate sensor data (e.g., by virtue of one or more signals) associated with a door position status, which may be interpreted by the edge device 102 to determine whether the door is in a closed position or an open position, and/or a latchbolt sensor configured to generate sensor data (e.g., by virtue of one or more signals) associated with a latchbolt status, which may be interpreted by the edge device 102 to determine whether the latchbolt is in an extended position or a retracted position. In various embodiments, additional and/or alternative sensors other than those described above may be included in the edge device 102. For example, the sensors may include environmental sensors (e.g., temperature sensors, air pressure sensors, humidity sensors, light sensors, etc.), inertial sensors (e.g., accelerometers, gyroscopes, etc.), magnetometers, proximity sensors, optical sensors, electromagnetic sensors, audio sensors (e.g., microphones), motion sensors, cameras, piezoelectric sensors, pressure sensors, switches (e.g., reed switches), and/or other types of sensors.

The wireless access point 104 may be embodied as any one or more devices that, individually or collectively, allow wireless communication devices (e.g., the edge device 102) to connect to a wired network and/or the Internet (e.g., via the network 106). For example, in some embodiments, the wireless access point 104 may be embodied as a gateway device that is communicatively coupled to a router. In other embodiments, the wireless access point 104 may form an integral component of or otherwise form a portion of the router itself. For simplicity and clarity of the description, the wireless access point 104 is described herein as being communicatively coupled to the Internet. Further, in some embodiments, it should be appreciated that the wireless access point 104 is configured to wirelessly communicate with devices (e.g., the edge device 102) via Wi-Fi communication circuitry.

The network 106 may be embodied as any type of communication network capable of facilitating communication between the various devices of the system 100. As such, the network 106 may include one or more networks, routers, switches, computers, and/or other intervening devices. For example, the network 106 may be embodied as or otherwise include one or more cellular networks, telephone networks, local or wide area networks, publicly available global networks (e.g., the Internet), ad hoc networks, or a combination thereof.

It should be appreciated that the edge device 102 and/or the wireless access point 104 may be embodied as one or more computing devices similar to the computing device 200 described below in reference to FIG. 2. For example, each of the edge device 102 and the wireless access point 104 may include a processing device 202 and a memory 206 having stored thereon operating logic 208 (e.g., a plurality of instructions) for execution by the processing device 202 for operation of the corresponding device.

Figure 2:
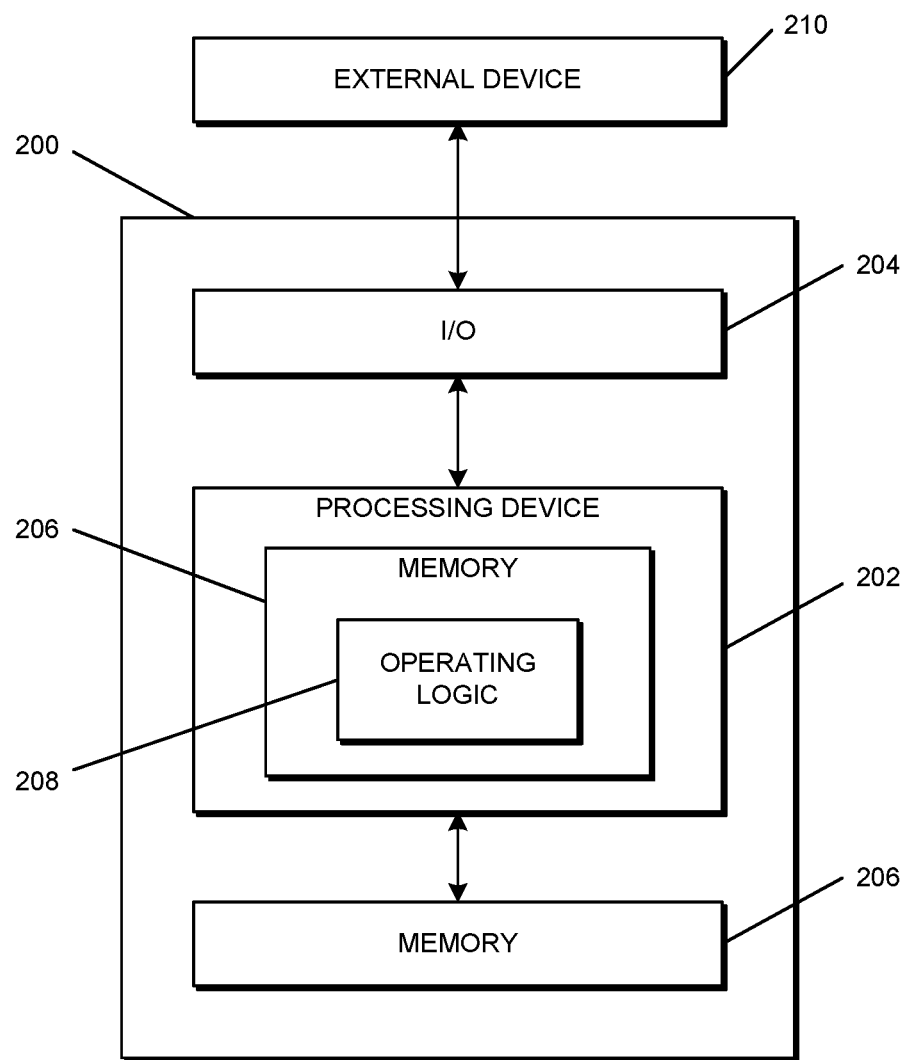
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an edge device 102 and/or wireless access point 104 illustrated in FIG. 1. Depending on the particular embodiment, computing device 200 may be embodied as an edge device, access control device, reader device, server, desktop computer, laptop computer, tablet computer, notebook, netbook, Ultrabook™, mobile computing device, cellular phone, smartphone, wearable computing device, personal digital assistant, Internet of Things (IOT) device, control panel, processing system, router, gateway, wireless access point, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth (including Bluetooth Low Energy (BLE), Wi-Fi, Near Field Communication (NFC), WiMAX, ZigBee, Z-wave, IEEE 802.15, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the edge device 102 and/or the wireless access point 104. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
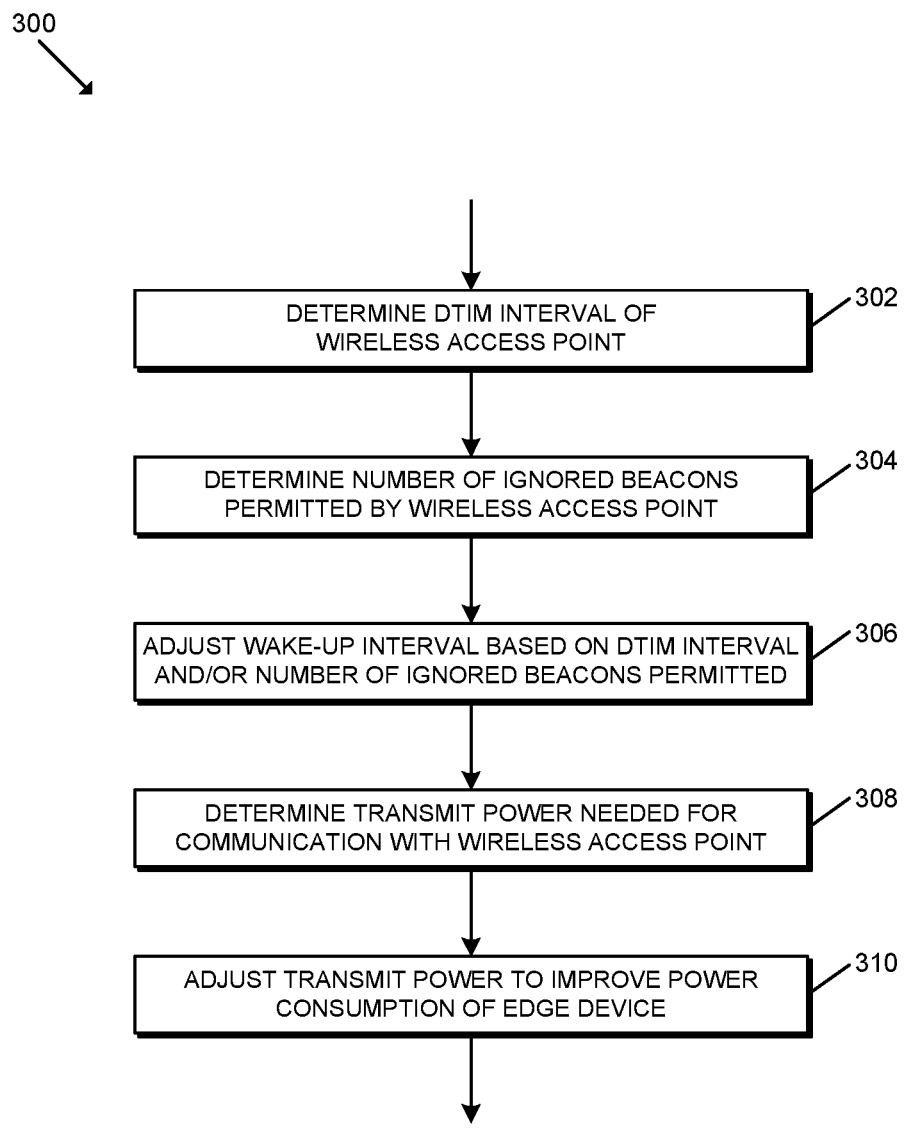
FIG. 3 is a simplified flow diagram of at least one embodiment of a method for reducing the power consumption of wireless communication circuitry of the edge device of the system of FIG. 1.

Referring now to FIG. 3, in use, the system 100 or, more specifically, the edge device 102 may execute a method 300 for reducing the power consumption of wireless communication circuitry (e.g., Wi-Fi circuitry) of the edge device 102. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the edge device 102 determines a delivery traffic indication map (DTIM) interval of the wireless access point 104. It should be appreciated that the delivery traffic indication map of the wireless access point 104 is a number/value that determines how frequently a beacon frame is transmitted (e.g., via Wi-Fi) from the wireless access point 104 to networked devices (e.g., the edge device 102) including a delivery traffic indication message (collectively referred to herein as DTIM or DTIM interval for simplicity).

In block 304, the edge device 102 determines the number of beacons from the wireless access point 104 to the edge device 102 that the wireless access point 104 allows to be "skipped" or ignored by the edge device 102 (e.g., without loss of a communication connection between the edge device 102 and the wireless access point 104). In block 306, the edge device 102 adjusts a wake-up interval of the wireless communication circuitry (e.g., Wi-Fi circuitry) based on the DTIM interval and/or the number of ignored beacons permitted by the wireless access point 104.

As described above, the IEEE 802.11 standard offers a significant amount of latitude to wireless access point vendors with respect to various aspects of the operation of wireless access points 104. For example, the current standard does not mandate a particular DTIM setting of the wireless access point 104; instead, the standard allows vendors discretion with that particular wireless access point characteristic. The number of beacons that can be ignored by an edge device 102 without loss of a connection between the edge device 102 and the wireless access point 104 is likewise not predefined by the current standard and, as a result, the connection-dropping behavior of wireless access points 104 is also not uniformly defined across all wireless access points 104.

Further, it should be appreciated that the DTIM setting of the wireless access point 104 may not be a parameter that is readily available to the edge device 102, for example, by simply querying the wireless access point 104 for that setting. Rather, in the illustrative embodiment, the edge device 102 "learns" or determines the DTIM setting based on wireless communications (e.g., via Wi-Fi) between the edge device 102 and the wireless access point 104 (e.g., over time) and adjusts the wake-up interval of the wireless communication circuitry (e.g., Wi-Fi circuitry) of the edge device 102 accordingly to conserve energy. For example, suppose the wireless access point 104 has a DTIM interval corresponding with transmitting a DTIM beacon every 200 ms and the edge device 102 has a default wake-up interval of 100 ms indicating that the edge device 102 is configured to wake its wireless communication circuitry (e.g., Wi-Fi circuitry) every 100 ms to "listen" for a beacon from the wireless access point 104. In such an embodiment, the edge device 102 is waking its wireless communication circuitry to listen for a beacon twice as frequently as necessary, which results in unnecessary power consumption and wasted energy. Accordingly, in the illustrative embodiment, the edge device 102 may be configured to ascertain that the DTIM interval of that particular wireless access point 104 is 200 ms and adjust the wake-up interval from 100 ms to 200 ms and synchronize it to coincide with the DTIM beacon transmittal, thereby reducing and/or minimizing the related power consumption.

The edge device 102 may learn or determine the DTIM setting of the wireless access point 104 using any suitable technique and/or mechanism. For example, in some embodiments, the wireless communication circuitry (e.g., a Wi-Fi chip or circuitry) of the edge device 102 may determine the DTIM setting of the wireless access point 104, whereas in other embodiments, the wireless communication circuitry of the edge device 102 may not have such capabilities to learn/determine the DTIM setting of the wireless access point 104 in which case the edge device 102 may make that determination via an application executing on the edge device 102. More specifically, in some embodiments in which the wireless communication circuitry of the edge device 102 can "intelligently" ascertain the DTIM setting of the wireless access point 104, the edge device 102 may include wireless communication circuitry (e.g., a Wi-Fi chip or circuitry) that provides an API that can be queried by an application of the edge device 102 to retrieve that value. In either case, in the illustrative embodiment, the wireless access point 104 is not able to be directly queried for its DTIM setting.

As indicated above, in the illustrative embodiment, the edge device 102 "skips" or "ignores" some of the beacons in order to reduce/optimize power consumption and improve/optimize battery life of the edge device 102. However, it should be appreciated that if an edge device 102 ignores enough of those beacons consecutively, the wireless access point 104 typically will drop the wireless communication connection (e.g., Wi-Fi connection) with the edge device 102 at some point, deeming the edge device 102 as nonresponsive. That is, the wireless access point 104 may drop wireless connections with edge devices 102 that it deems nonresponsive, for example, to "free" one of its communication channels for another connecting device (e.g., another edge device 102). If a connection is dropped, the edge device 102 reconnects with the wireless access point 104 to reestablish a wireless communication connection (e.g., via Wi-Fi), which consumes further power/energy. As such, in the illustrative embodiment, the edge device 102 may learn the limit for the number beacons that the edge device 102 can ignore from the wireless access point 104 without the wireless access point 104 dropping the connection. For example, suppose that a particular wireless access point 104 has a DTIM interval of 100 ms but does not drop a connection with an edge device 102 until that edge device 102 ignores five beacons (e.g., DTIM beacons). In such an embodiment, the edge device 102 may learn that characteristic of the wireless access point 104 (e.g., via repeated communications, machine learning, and/or otherwise) and adjust the wake-up interval from 100 ms to 500 ms and synchronize it with every fifth beacon, thereby reducing and/or minimizing the related power consumption.

It should be appreciated that, in some embodiments, the edge device 102 may adjust the wake-up interval of the wireless communication circuitry (e.g., Wi-Fi circuitry) based on both the DTIM interval and the number of ignored beacons permitted by the wireless access point 104. However, in other embodiments, the edge device 102 may adjust the wake-up interval of the wireless communication circuitry based on only the DTIM interval. And, in yet other embodiments, the edge device 102 may adjust the wake-up interval of its wireless communication circuitry based on other the number of ignored beacons permitted by the wireless access point 104. In some embodiments, the edge device 102 may incorporate additional characteristics of the network environment and/or other consideration into determining the appropriate wake-up interval of the wireless communication circuitry to reduce power consumption.

In some embodiments, the edge device 102 may apply and/or leverage machine learning in order to determine the wake-up interval to which to adjust the wireless communication circuitry (e.g., Wi-Fi circuitry) for a reduction in power consumption. In embodiments leveraging machine learning, it should be appreciated that the edge device 102 may utilize any inputs, machine learning model, and/or machine learning algorithm suitable for performing the functions described herein. For example, in some embodiments, the edge device 102 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms. For example, at least one embodiment of a machine learning model for determining a delivery traffic indication map (DTIM) interval that reduces the power consumption of the edge device 102 of the system 100 is described below in reference to FIG. 4.

As indicated above, in some embodiments, the edge device 102 may, additionally or alternatively, reduce the transmit power of the wireless communication circuitry (e.g., Wi-Fi circuitry) relative to the maximum/full transmit power of the wireless communication circuitry in order to reduce power consumption of the edge device 102. As such, in block 308, the edge device 102 determines a reduced transmit power (e.g., relative to full transmit power) of the wireless communication circuitry (e.g., Wi-Fi circuitry) of the edge device 102 that is still sufficient for reliable communication with the wireless access point 104. In block 310, the edge device 102 adjusts a transmit power of the wireless communication circuitry (e.g., Wi-Fi circuitry) based on the edge device's 102 determination of the reduced transmit power for the wireless communication circuitry.

In many traditional implementations, it should be appreciated that the transmit power level of the wireless communication circuitry (e.g., Wi-Fi circuitry) of a particular edge device 102 is often set statically to the maximum transmit power value (e.g., to ensure the communication range of that circuitry is maximized). However, in many systems 100, the edge device 102 may be positioned relative to the wireless access point 104 such that maximum transmit power is greater than necessary for reliable communication with the edge device 102. Further, in some embodiments, the edge device 102 may be in a relatively stationary position, have fixed movements (e.g., as with the fixed path of a door-mounted device), and/or have restricted movements (e.g., to within a limited range). For example, in some embodiments, the edge device 102 may be embodied as an access control device secured to a barrier (e.g., door, window, gate, etc.) and configured to move along a relatively fixed and pre-defined path (e.g., as the barrier opens/closes). Even if not set to the maximum transmit power, the transmit power may nonetheless be set to a transmit power that is greater than necessary for reliable communication with the edge device 102. As such, it should be appreciated that the transmit power of the wireless communication circuitry of the edge device 102 required for reliable communication with the wireless access point 104 may vary depending on the environmental characteristics of the wireless access point 104. For example, the transmit power of the wireless communication circuitry may be set to 18 dBm in an embodiment in which only 12 dBm is needed for consistent and reliable communication with the wireless access point 104.

When a connection is dropped, it should be appreciated that the edge device 102 may attempt to reestablish a wireless communication connection with the wireless access point 104. In some embodiments, the edge device 102 attempts to reconnect with the wireless access point 104 one or more times (e.g., the number of times which may vary depending on the embodiment) and, if unsuccessful, the edge device 102 no longer attempts to reconnect. Further, in some embodiments, the failure to reconnect may also prompt the edge device 102 to place one or more components (e.g., the wireless communication circuitry) of the edge device 102 in a low-power or sleep state, which may reduce further power consumption. It should be appreciated that the failure to reconnect could be based, for example, on the wireless access point 104 itself being powered down or disconnected, in which case repeated connection attempts by the edge device 102 would be for naught and unnecessarily consume power. The edge device 102 may subsequently reconnect to the wireless access point 104 using any suitable technique. For example, in some embodiments, the edge device 102 may subsequently reconnect in response to a manual and/or user input (e.g., pushing a button on the edge device 102, a BLE connection, etc.). In some embodiments, the edge device 102 may attempt to reconnect periodically (e.g., once every day, once every other day, etc.).

In the illustrative embodiment, the edge device 102 may query and/or otherwise communicate with the wireless access point 104 to determine whether the wireless access point 104 is receiving a sufficiently strong signal from the edge device 102 for reliable communication (e.g., by repeated communications between the edge device 102 and the wireless access point 104). For example, in some embodiments, the edge device 102 may determine the Received Signal Strength Indicator (RSSI) of the signal and/or other indicator of signal strength (e.g., directly, inherently, or derived). It should be appreciated that the strength of the signal determined to be "sufficient" may vary depending on the particular embodiment. It should be further appreciated that the transmit power needed for a sufficiently strong signal may vary depending on the distance of the edge device 102 relative to the wireless access point 104 and, therefore, the reduced transmit power limits may be determined for various positions of the edge device 102 in some embodiments (e.g., in embodiments in which the edge device 120 is a door-mounted access control device).

In some embodiments, the edge device 102 may apply and/or leverage machine learning in order to determine the limits of the wireless communication signal reliability of the edge device 102 with respect to the wireless access point 104 and varying transmit power of the edge device 102. For example, as described below in reference to FIG. 5, the edge device 102 may apply machine learning with one or more inputs associated with acknowledgement data that identifies the signal reliability of communications between the edge device 102 and the wireless access point 104 in some embodiments. Further, in embodiments leveraging machine learning, it should be appreciated that the edge device 102 may utilize any inputs, machine learning model, and/or machine learning algorithm suitable for performing the functions described herein. For example, in some embodiments, the edge device 102 may utilize one or more of the machine learning algorithms, techniques, and/or mechanisms described above. For example, at least one embodiment of a machine learning model for determine a wireless communication circuitry transmit power that reduces power consumption of the edge device 102 of the system 100 is described below in reference to FIG. 5.

In some embodiments, additionally or alternatively, the edge device 102 may be configured to apply similar techniques with respect to a reduction of the receive power of the wireless communication circuitry (e.g., Wi-Fi circuitry) of the edge device 102. For example, in some embodiments, the edge device 120 determines a reduced receive power (e.g., relative to maximum receive power) of the wireless communication circuitry (e.g., Wi-Fi circuitry) of the edge device 102 that is still sufficient for reliable communication with the wireless access point 104, and the edge device 102 adjusts a receive power of the wireless communication circuitry based on the edge device's 102 determination of the reduced receive power for the wireless communication circuitry. For example, in some embodiments, the edge device 102 includes multiple wireless communication transceivers that are configured to receive communications yet have different power consumptions, in which case the edge device 102 may select from the wireless communication transceivers to reduce the receive power for the wireless communication circuitry.

Although the blocks 302-310 are described in a relatively serial manner, it should be appreciated that various blocks of the method 300 may be performed in parallel in some embodiments.

As described above, in some embodiments, one or more of the functions of the method 300 of FIG. 3 may be performed in conjunction with one or more machine learning algorithms, techniques, and/or mechanisms. It should be appreciated that the training, retraining, and/or adaption of such algorithms can be performed using any suitable technique, according to any suitable schedule, and/or in response to any suitable condition/trigger. For example, in some embodiments, the training may occur at startup and/or if there is a significant shift in one or more of the relevant input parameters. As indicated above, example machine learning models 500, 600 are described in reference to FIGS. 5-6. However, it should be appreciated that the system 100 may utilize different machine learning models 500, 600 in other embodiments.

Figure 4:
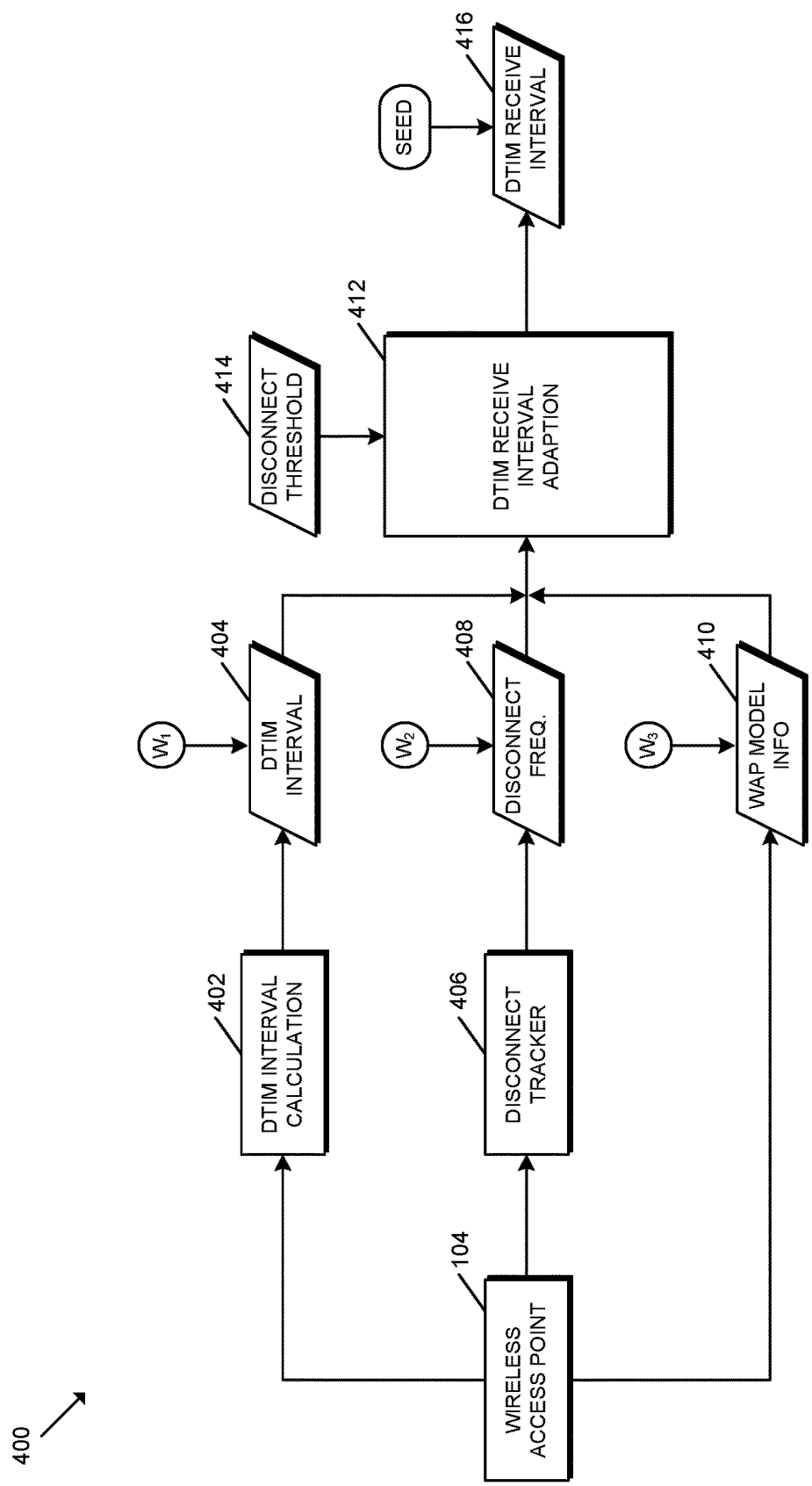
FIG. 4 is a simplified flow diagram of at least one embodiment of a machine learning model for determining a delivery traffic indication map (DTIM) interval that reduces the power consumption of the edge device of the system of FIG. 1.

Referring now to FIG. 4, in use, the system 100 or, more specifically, the edge device 102 may apply a machine learning model 400 for determining a delivery traffic indication map (DTIM) interval that reduces the power consumption of the edge device 102. It should be appreciated that the particular inputs/outputs of the model 400 are illustrated by way of example, and such inputs/outputs may be combined or divided, added or removed, and/or reordered in whole or in part depending on the particular embodiment, unless stated to the contrary.

In the illustrative embodiment, the machine learning model 400 includes the wireless access point 104, a DTIM interval calculation module 402, a DTIM interval 404, a disconnect tracker module 406, a disconnect frequency 408, wireless access point model information 410, a DTIM receive interval adaption module 412, a disconnect threshold 414, and a DTIM receive interval 416. In the illustrative embodiment, the DTIM receive interval adaption module 412 leverages a machine learning algorithm in conjunction with specific inputs (i.e., the DTIM interval 404, the disconnect frequency 408, and the wireless access point model information 410), weights associated with those inputs (e.g., $W_1$, $W_2$, and $W_3$), any constants/bounds/thresholds (i.e., the disconnect threshold 414), and a specific output (i.e., the DTIM receive interval 416). As indicated above, it should be appreciated that the machine learning algorithm applied in the module 412 may be any combination of one or more machine learning and/or artificial intelligence algorithms including, for example, one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms. Further, in the illustrative embodiment, the seed value for the DTIM receive interval 416 may be 100 ms.

As described above, the DTIM interval calculation module 402 calculates and/or otherwise determines the DTIM interval/value 404 of the wireless access point 104 (e.g., via communications/beacons between the edge device 102 and the wireless access point 104). The disconnect tracker module 406 identifies, determines, and/or tracks the disconnections between the edge device 102 and the wireless access point 104 and calculates the frequency of those disconnections (i.e., the disconnect frequency 408). Further, the wireless access point model information 410 may include data known regarding the wireless access point 104 in advance. For example, in some embodiments, the wireless access point 104 manufacturer/vendor may supply information that identifies the DTIM interval 404 of the wireless access point 104, thereby obviating the need to ascertain that information. In other embodiments, the DTIM interval 404 of the particular model of wireless access point 104 may have already been ascertained by the system 100, likewise obviating the need to ascertain that information. The disconnect threshold 414 indicates the maximum number of disconnections (and/or skipped beacons) that are acceptable in the particular embodiment (e.g., even if permitted by the wireless access points 104).

In some embodiments, the edge device 102 may apply a machine learning model similar to the machine learning model 400 for determining the extent or limit to the number/ amount of Broadcasting/Multicasting Traffic messages, ARP packets, and/or other relevant data transmissions that can be ignored without the wireless access point 104 dropping the connection with the edge device 102.

Figure 5:
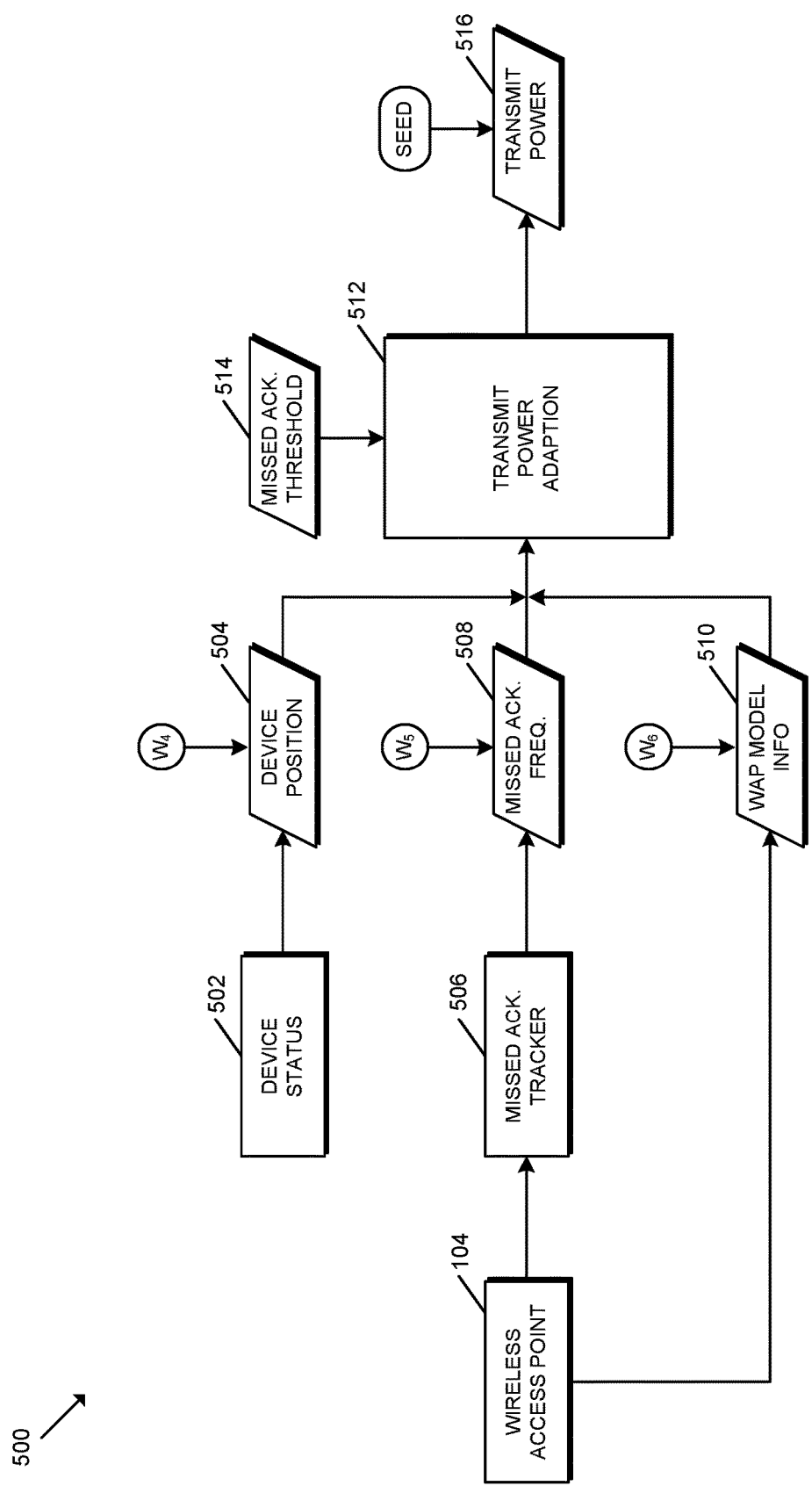
FIG. 5 is a simplified flow diagram of at least one embodiment of a machine learning model for determining a wireless communication circuitry transmit power that reduces power consumption of the edge device of the system of FIG. 1.

Referring now to FIG. 5, in use, the system 100 or, more specifically, the edge device 102 may apply a machine learning model 500 for determining a wireless communication circuitry (e.g., Wi-Fi) transmit power that reduces the power consumption of the edge device 102. It should be appreciated that the particular inputs/outputs of the model 400 are illustrated by way of example, and such inputs/outputs may be combined or divided, added or removed, and/or reordered in whole or in part depending on the particular embodiment, unless stated to the contrary.

In the illustrative embodiment, the machine learning model 500 includes the wireless access point 104, a device status module 502, a device position 504, a missed acknowledgement tracker 506, a missed acknowledgement frequency 508, wireless access point model information 510, a transmit power adaption module 512, a missed acknowledgement threshold 514, and a transmit power 516. As such, it should be appreciated that the model 500 is directed to an embodiment in which the edge device 102 is an access control device or other door-mounted device.

In the illustrative embodiment, the transmit power adaption module 512 leverages a machine learning algorithm in conjunction with specific inputs (i.e., the device position 504, the missed acknowledgement frequency 508, and the wireless access point model information 510), weights associated with those inputs (e.g., $W_4$, $W_5$, and $W_6$), any constants, bounds or thresholds (i.e., the missed acknowledgement threshold 514), and a specific output (i.e., the transmit power 516). As indicated above, it should be appreciated that the machine learning algorithm applied in the module 512 may be any combination of one or more machine learning and/or artificial intelligence algorithms including, for example, one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms. Further, in the illustrative embodiment, the seed value for the transmit power 516 may be the maximum power of the wireless communication circuitry (e.g., Wi-Fi circuitry) of the edge device 102.

The device status module 502 calculates and/or otherwise determines the position of the edge device 102 (e.g., the device position 504). For example, in some embodiments, the edge device 102 may be embodied as a barrier-mounted access control device, and the device status module 502 may determine whether the edge device 102 is in a position corresponding with the barrier being in an open position or a closed position. In other embodiments, the device position 504 may more granularly distinguish between positions of the edge device 102. It should be appreciated that the position of the edge device 102 may be important as it could affect the distance of the edge device 102 relative to the wireless access point 104, the orientation of the edge device 102 relative to the wireless access point 104, the number/type of barriers/interference between the edge device 102 and the wireless access point, and/or other relevant factors. More specifically, it should be appreciated that the change in orientation of the edge device 102 relative to the wireless access point 104 may change the orientation of the wireless communication circuitry relative to the wireless access point 104 (e.g., from one state to 90-degrees relative to that). Accordingly, it should be appreciated that the position of the edge device 102 may affect the transmit power needed for reliable communication with the wireless access point 104.

The missed acknowledgement tracker 506 is configured to transmit a query to the wireless access point 104 and receive/track the acknowledgements received back from the wireless access point 104 in order to identify, determine, and/or track the frequency of missed acknowledgements (i.e., the missed acknowledgement frequency 508). Further, the wireless access point model information 510 may include data known regarding the wireless access point 104 in advance. The missed acknowledgement threshold 514 indicates the maximum number of acknowledgements that can be skipped in the particular embodiment.

It should be appreciated that, in some embodiments, the edge device 102 may include multiple antennas arranged in different orientations relative to a fixed reference. In such embodiments, the model 500 may include an additional input/model associated with the antennas. For example, holding all other inputs constant, one of the antennas of the edge device 102 may be able to communicate with the wireless access point 104 at a lower transmit power than another of the antennas of the edge device 102 based (e.g., solely) on the orientation of the antennas relative to the wireless access point 104. Accordingly, considering which antenna to use may further reduce the overall transmit power consumed by the edge device 102.

According to an embodiment, a method of reducing a power consumption of wireless communication circuitry of an edge device may include determining, by the edge device, a delivery traffic indication map (DTIM) interval of a wireless access point communicatively coupled to the edge device via the wireless communication circuitry of the edge device, and adjusting, by the edge device, a wake-up interval of the wireless communication circuitry of the edge device based on the DTIM interval to reduce the power consumption of the wireless communication circuitry of the edge device.

In some embodiments, the method may further include determining, by the edge device, a number of beacons from the wireless access point that can be ignored without loss of a communication connection between the edge device and the wireless access point.

In some embodiments, adjusting the wake-up interval of the wireless communication circuitry of the edge device may include adjusting the wake-up interval of the wireless communication circuitry of the edge device based on the DTIM interval and the number of beacons.

In some embodiments, adjusting the wake-up interval of the wireless communication circuitry of the edge device may include applying machine learning with one or more inputs associated with the DTIM interval and disconnect tracking data that identifies information associated with one or more disconnections between the edge device and the wireless access point.

In some embodiments, the method may further include determining, by the edge device, a reduced transmit power of the wireless communication circuitry of the edge device sufficient for reliable communication with the wireless access point, wherein the reduce transmit power is reduced relative to a full transmit power of the wireless communication circuitry of the edge device, and adjusting, by the edge device, a transmit power of the wireless communication circuitry of the edge device based on the reduced transmit power determined to be sufficient for reliable communication with the wireless access point.

In some embodiments, adjusting the transmit power of the wireless communication circuitry may include applying machine learning with one or more inputs associated with acknowledgment data that identifies signal reliability of communications with the wireless access point.

In some embodiments, the method may further include determining, by the edge device, a position of the edge device based on sensor data, and adjusting the transmit power of the wireless communication circuitry of the edge device may include adjusting the transmit power of the wireless communication circuitry of the edge device based on the reduced transmit power determined to be sufficient for reliable communication with the wireless access point and the position of the edge device.

In some embodiments, the wireless communication circuitry may include a Wi-Fi communication circuitry.

In some embodiments, the edge device may include an access control device including a physical lock mechanism to secure a corresponding passageway, and the wireless access point may include a router.

In some embodiments, adjusting the wake-up interval of the wireless communication circuitry of the edge device based on the DTIM interval to reduce the power consumption of the wireless communication circuitry of the edge device may include adjusting the wake-up interval of the wireless communication circuitry of the edge device to optimize the power consumption of the wireless communication circuitry of the edge device.

According to another embodiment, an edge device may include a Wi-Fi communication circuitry, at least one processor, and at least one memory comprising a plurality of instructions stored thereon that, in response to execution by the at least one processor, causes the edge device to determine a delivery traffic indication map (DTIM) interval of a wireless access point communicatively coupled to the edge device via the Wi-Fi communication circuitry, and adjust a wake-up interval of the Wi-Fi communication circuitry based on the DTIM interval to reduce the power consumption of the edge device.

In some embodiments, the plurality of instructions may further cause the edge device to determine a number of beacons from the wireless access point that can be ignored without loss of a Wi-Fi communication connection between the edge device and the wireless access point.

In some embodiments, to adjust the wake-up interval of the Wi-Fi communication circuitry may include to adjust the wake-up interval of the Wi-Fi communication circuitry based on the DTIM interval and the number of beacons.

In some embodiments, to adjust the wake-up interval of the Wi-Fi communication circuitry may include to apply machine learning with one or more inputs associated with the DTIM interval and disconnect tracking data that identifies information associated with one or more disconnections between the Wi-Fi communication circuitry and the wireless access point.

In some embodiments, the plurality of instructions may further cause the edge device to determine a reduced transmit power of the Wi-Fi communication circuitry sufficient for reliable communication with the wireless access point, wherein the reduce transmit power is reduced relative to a full transmit power of the Wi-Fi communication circuitry, and adjust a transmit power of the Wi-Fi communication circuitry based on the reduced transmit power determined to be sufficient for reliable communication with the wireless access point.

In some embodiments, to adjust the transmit power of the Wi-Fi communication circuitry may include to apply machine learning with one or more inputs associated with acknowledgment data that identifies signal reliability of Wi-Fi communications with the wireless access point.

In some embodiments, the plurality of instructions may further cause the edge device to determine a position of the edge device based on sensor data, and to adjust the transmit power of the Wi-Fi communication circuitry may include to adjust the transmit power of the Wi-Fi communication circuitry based on the reduced transmit power determined to be sufficient for reliable communication with the wireless access point and the position of the edge device.

In some embodiments, the edge device may further include a physical lock mechanism having at least one of a latch or a bolt to secure a corresponding passageway.

According to yet another embodiment, an access control device may include a Wi-Fi communication circuitry, a lock mechanism having at least one of a latch or a bolt to secure a corresponding passageway, at least one processor, and at least one memory comprising a plurality of instructions stored thereon that, in response to execution by the at least one processor, causes the access control device to determine a delivery traffic indication map (DTIM) interval of a wireless access point communicatively coupled to the access control device via the Wi-Fi communication circuitry, determine a number of beacons from the wireless access point that can be ignored without loss of a Wi-Fi communication connection between the edge device and the wireless access point, and adjust a wake-up interval of the Wi-Fi communication circuitry based on the DTIM interval and the number of beacons to reduce the power consumption of the access control device.

In some embodiments, the plurality of instructions may further cause the access control device to determine a reduced transmit power of the Wi-Fi communication circuitry sufficient for reliable communication with the wireless access point, wherein the reduce transmit power is reduced relative to a full transmit power of the Wi-Fi communication circuitry, and adjust a transmit power of the Wi-Fi communication circuitry based on the reduced transmit power determined to be sufficient for reliable communication with the wireless access point.

What is claimed is:

1. A method of reducing a power consumption of wireless communication circuitry of an edge device, the method comprising:

learning, by an edge device, a delivery traffic indication map (DTIM) interval of a wireless access point communicatively coupled to the edge device via the wireless communication circuitry of the edge device using machine learning based on a machine learning model that includes an input associated with the DTIM interval;

learning, by the edge device, at least one of (i) a number of Broadcasting/Multicasting Traffic messages received from the wireless access point that can be ignored without loss of a communication between the edge device and the wireless access point using machine learning, or (ii) a number of Address Resolution Protocol (ARP) packets received from the wireless access point that can be ignored without loss of a communication between the edge device and the wireless access point using machine learning; and adjusting, by the edge device, a wake-up interval of the wireless communication circuitry of the edge device based on the DTIM interval to reduce the power consumption of the wireless communication circuitry of the edge device.

2. The method of claim 1, further comprising learning, by the edge device, a number of beacons from the wireless access point that can be ignored without loss of a communication between the edge device and the wireless access point using machine learning.

3. The method of claim 2, wherein adjusting the wake-up interval of the wireless communication circuitry of the edge device comprises adjusting the wake-up interval of the wireless communication circuitry of the edge device based on the DTIM interval and the number of beacons.

4. The method of claim 1, wherein learning the DTIM interval of the wireless access point using the machine learning based on the machine learning model comprises learning the DTIM interval of the wireless access point using machine learning executing on the wireless communication circuitry of the edge device.

5. A method of reducing a power consumption of wireless communication circuitry of an edge device, the method comprising:
    learning, by an edge device, a delivery traffic indication map (DTIM) interval of a wireless access point communicatively coupled to the edge device via the wireless communication circuitry of the edge device using machine learning based on a machine learning model that includes an input associated with the DTIM interval; and
    adjusting, by the edge device, a wake-up interval of the wireless communication circuitry of the edge device based on the DTIM interval to reduce the power consumption of the wireless communication circuitry of the edge device; and
    wherein the machine learning model includes respective weights for the input associated with the DTIM interval and an input associated with a disconnect frequency of communication connections between the wireless communication circuitry and the wireless access point.

6. A method of reducing a power consumption of wireless communication circuitry of an edge device, the method comprising:
    learning, by an edge device, a delivery traffic indication map (DTIM) interval of a wireless access point communicatively coupled to the edge device via the wireless communication circuitry of the edge device using machine learning based on a machine learning model that includes an input associated with the DTIM interval; and
    adjusting, by the edge device, a wake-up interval of the wireless communication circuitry of the edge device based on the DTIM interval to reduce the power consumption of the wireless communication circuitry of the edge device; and
    wherein another input of the machine learning model comprises model information associated with the wireless access point.

7. The method of claim 1, wherein the edge device comprises an access control device including a physical lock mechanism to secure a corresponding passageway.

8. An edge device, comprising:
    a wireless communication circuitry;
    at least one processor, wherein the wireless communication circuitry comprises the at least one processor;
    at least one memory comprising a plurality of instructions stored thereon that, in response to execution by the at least one processor, causes the edge device to:
        learn a delivery traffic indication map (DTIM) interval of a wireless access point communicatively coupled to the edge device via the wireless communication circuitry using machine learning based on a machine learning model that includes an input associated with the DTIM interval; and
        adjust a wake-up interval of the wireless communication circuitry based on the DTIM interval to reduce the power consumption of the wireless communication circuitry;
    another at least one processor; and
    another at least one memory comprising another plurality of instructions stored thereon that, in response to execution by the another at least one processor, causes the another at least one processor to execute an application of the edge device to query an application programming interface (API) of the wireless communication circuitry to retrieve a value associated with the DTIM interval.

9. The edge device of claim 8, wherein the wireless communication circuitry comprises a Wi-Fi communication circuitry.

10. The edge device of claim 8, further comprising a physical lock mechanism having at least one of a latch or a bolt to secure a corresponding passageway.

11. An edge device, comprising:
    a wireless communication circuitry;
    at least one processor; and
    at least one memory comprising a plurality of instructions stored thereon that, in response to execution by the at least one processor, causes the edge device to:
        determine at least one of a reduced receive power or a reduced transmit power of the wireless communication circuitry sufficient for reliable communication with a wireless access point using machine learning based on a machine learning model that includes an input associated with data that identifies signal reliability of communications with the wireless access point, wherein the machine learning model includes respective weights for an input associated with the device position and an input associated with a number of missed acknowledgements from the wireless access point, wherein the reduced receive power is reduced relative to a full receive power of the wireless communication circuitry, and wherein the reduced transmit power is reduced relative to a full transmit power of the wireless communication circuitry; and
        adjust at least one of a receive power or a transmit power of the wireless communication circuitry based on the at least one of the reduced receive power or the reduced transmit power determined to be sufficient for reliable communication with the wireless access point.

12. The edge device of claim 11, further comprising at least one sensor configured to generate sensor data;
    wherein the plurality of instructions further cause the edge device to determine a device position of the edge device based on the sensor data; and
    wherein to adjust the at least one of the receive power or the transmit power of the wireless communication circuitry of the edge device comprises to adjust the at least one of the receive power or the transmit power of the wireless communication circuitry of the edge device based on the at least one of the reduced receive power or the reduced transmit power determined to be sufficient for reliable communication with the wireless access point and the device position of the edge device.

13. The edge device of claim 11, wherein another input of the machine learning model comprises model information associated with the wireless access point.

14. The edge device of claim 11, further comprising a physical lock mechanism having at least one of a latch or a bolt to secure a corresponding passageway.

15. The edge device of claim 11, wherein the wireless communication circuitry comprises a Wi-Fi communication circuitry.

16. The method of claim 1, wherein the machine learning model includes respective weights for the input associated with the DTIM interval and an input associated with a disconnect frequency of communication connections between the wireless communication circuitry and the wireless access point.

17. The method of claim 1, wherein another input of the machine learning model comprises model information associated with the wireless access point.

18. The method of claim 5, wherein learning the DTIM interval of the wireless access point using the machine learning based on the machine learning model comprises learning the DTIM interval of the wireless access point using machine learning executing on the wireless communication circuitry of the edge device.

19. The method of claim 6, wherein learning the DTIM interval of the wireless access point using the machine learning based on the machine learning model comprises learning the DTIM interval of the wireless access point using machine learning executing on the wireless communication circuitry of the edge device.

* * * * *